July 24, 1962   R. PRESCOTT   3,045,531
OPTICAL GRATING

Filed April 5, 1956   3 Sheets-Sheet 1

*INVENTOR.*
ROCHELLE PRESCOTT
BY *Walter G. Finch*
ATTORNEY

July 24, 1962   R. PRESCOTT   3,045,531
OPTICAL GRATING

Filed April 5, 1956   3 Sheets-Sheet 2

| 2,2 | 2,1 | 2,0 | 2,1 | 2,2 |
| 1,2 | 1,1 | 1,0 | 1,1 | 1,2 |
| 0,2 | 0,1 | 0   | 0,1 | 0,2 |
| 1,2 | 1,1 | 1,0 | 1,1 | 1,2 |
| 2,2 | 2,1 | 2,0 | 2,1 | 2,2 |

*INVENTOR.*
ROCHELLE PRESCOTT
BY
*Walter G. Finch*
ATTORNEY

July 24, 1962  R. PRESCOTT  3,045,531
OPTICAL GRATING

Filed April 5, 1956  3 Sheets-Sheet 3

AMPLITUDE GRATING

PHASE GRATING

PHASE RETARD AMPLITUDE GRATING

PHASE ADVANCE AMPLITUDE GRATING

ROCHELLE PRESCOTT
INVENTOR

BY Walter G. Finch
ATTORNEY

United States Patent Office 3,045,531
Patented July 24, 1962

3,045,531
OPTICAL GRATING
Rochelle Prescott, 75 Hillsdale Road, Arlington, Mass., assignor of one-third to Walter G. Finch, Baltimore, Md.
Filed Apr. 5, 1956, Ser. No. 576,267
17 Claims. (Cl. 88—14)

This invention relates to optical elements, and more particularly to simple gratings for use in optical testing methods in which the gratings are used to measure the aberration or error of light coming to a focus in terms of "ray error," where a ray is defined as the normal to a wavefront at a selected surface of reference.

It is an object of this invention to provide an improved simple grating for testing lens and optical systems for the purpose of evaluating the degree and type of aberrations present, if any.

Another object of the invention is to provide a simple grating for the evaluation of the optical path length variations in an optical system due to a change in the path length itself or due to a change in the index of refraction of the optical path.

Foucault, in 1859, described three methods for testing image forming optical systems and their components (L. Foucault, Ann. de l'Obser. de Paris (Mem.), V, o. 197, 1859). These are known today as Galileo's star test; Foucault's knife-edge test; and Ronchi's grating test.

A further method for testing optical systems and their components was introduced by J. Hartmann in 1904 (J. Hartmann, SZ. fur Inst. Kun., XXIV, 1, p. 1 1904). In addition several interferential methods were devised for/or adapted to the testing of optical lens systems or components during the past century. Each system has had various shortcomings which predicate against its use. None has the qualities of evaluating a lens system in a quantitative and precise manner with results which are readily compared with the ray-tracing calculations by which such systems are ordinarily designed.

The prior method of greatest interest here is the third method of Foucault, commonly known as Ronchi's grating test. The connection of Ronchi's name with this test is evidently due to his intensive efforts to explore the possibilities of the method and to popularize it as evidenced by several publications he wrote in 1923 (V. Ronchi, Annali della R. Scuola Normale Sup. Univ., Pisa, XV, 1923; Nuovo Cimento, XXIV, p. 169, 1923; Rend. Acc Nax., Lincei, XXXII, 2o sem. 5–6, p. 162, 1923); the writing of a monograph (V. Ronchi, "La Prova Dei Sistemi Ottici," Attulita Scientifiche—N. 37, Pisa R. Scuola Normale Superiore Annali, Sci. Fis. E. Nat., 15–16, 1927), about 1925; and two articles in Revue d'Optique, dated Nov. 11, 1926, pp. 441–449, and Nov. 2, 1928, pp. 49–67, all on the use of gratings of parallel or concentric circular lines for the testing of optical systems. In spite of this, these methods of testing are not in wide use today due to one serious limitation. This limitation is the diffraction effects which always cause difficulty in the carrying out of the test and in the interpretation of the results. This will be explained in detail in discussing the features of the present invention.

Attention is also directed to the work of G. Toraldo di Francia, in his paper entitled "Geometrical and Interferential Aspects of the Ronchi Test" (Proceedings of the NBS Semicentennial Symposium on Image Evaluation held at The National Bureau of Standards on October 18, 19, and 20, 1951: NBS Circular 526, dated April 29, 1954), which emphasizes the need for the improvement made in the test by the present invention. However, experimentally, no progress has been made since the time of Foucault.

The present invention concerns gratings or grids which produce diffraction spectra of zero and first orders, but not substantial spectra of other orders. The value and behavior of such gratings or grids will be explained with reference to various drawings, wherein.

In accordance with the invention, there is provided apparatus for ray tracing in an optical system. This apparatus includes a point or line source of light in an object position, a lens for test or evaluation, a grating which produces only spectra of the zero and first order, and means for observing and recording an image of the optical system. The grating is located between the lens and the means for observing and recording the image of the system. By means of this arrangement, the image of the system is characterized by fringes whose disposition are a quantitative measure of one component the aberrations of the lens in forming an image of said point source of light.

This invention also provides a unique method of ray tracing in an optical system. This method includes passing radiant energy from a point or line source of light through a refractive disturbance which is to be evaluated. The radiated energy is then passed through an optical system which includes at least a lens and a grating of the type producing only a zero and two first order spectra to form an image of the refractive disturbance. The image is characterized by fringes whose disposition are a quantitative measure of the refractive disturbance under evaluation.

These are also provided new optical elements which consist of at least a base material and a thin sheet of material associated therewith for producing only zero and first order spectra. The sheet of material is arranged to vary periodically in optical transmittance, reflectance, and pathlength characteristics in one (or two directions) lying within the sheet of material in such a manner that the characteristics are defined by certain mathematical expressions which will be pointed out subsequently.

Figure 1:
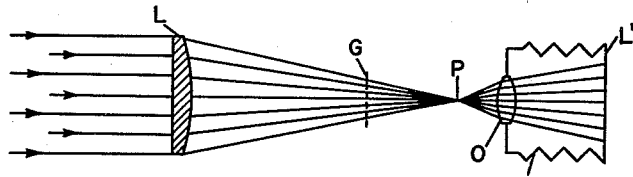
FIG. 1 is a diagram of an elementary arrangement for making a grating test of a converging lens.
Figure 1A:
FIG. 1A is a diagram of the image obtained by the optical system illustrated in FIG. 1.

The most elementary system for making a grating test of a converging lens is shown in FIG. 1. A beam of light from a narrow source in the object plane (in this case at infinity) falls on an object lens L, and is brought to a focus at a point P. A camera C is placed so that all of the beam passes through its objective O (its exact position being of no consequence) and focussed so that its focal plane is conjugate to the emergent principal plane of the lens L. A grating G is then placed close to the focus P with its plane normal to the optical axis of the lens L. According to simple ray theory for the moment no account of diffraction effects, such as a grating G would, under these conditions, be sharply projected onto the focal plane L' of the camera C, and, if the rays of light really went through the point P, and the lines of the grating G were straight, equidistant, and parallel, the image would be crossed by straight, equidistant, and parallel lines as shown in FIG. 1A.

In general, however, the light from different portions of the lens will not pass precisely through the point P, but will miss this point by small distances which are, roughly speaking, inverse in magnitude to the degree of perfection of the lens L. Since the rays are being assumed to travel in straight lines, these rays must also pass through the grating G in an abnormal position. As the value of the error changes in a continuous manner as rays considered from adjacent points on the lens L, the lines remain continuous but are no longer straight, equidistant, and parallel.

It is obvious that displacements of the rays parallel to the grating lines are immaterial in determining the position of the line shadows in the image and that only displacements perpendicular to the grating will affect the position of the line shadows, thus only that component of the aberration which displaces the ray normal to the lines of the grating will be measured. In order to determine quantitatively the value of the deviation, let there now be considered the optical system illustrated in FIG. 2.

Figure 2:
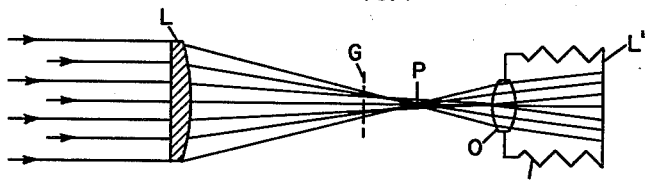
FIG. 2 is a diagram of an optical system similar to that shown in FIG. 1, except that the lens under test has not been corrected for optical aberrations.

In FIG. 2, the arrangement is the same as in FIG. 1, except that the lens L under test is under-corrected for spherical aberration. This causes the rays from the outer zones of the lens L to come to a focus nearer to the lens L than those from the central zones. In doing this, the rays pass through the plane of the grating G nearer the axis than in the case of the lens L without aberrations, as illustrated in FIG. 1.

The camera lens O, however, brings each ray to a particular point in the image plane, as illustrated by FIG. 2, regardless of its deviation, so there is a displacement of the grating shadow. It is generally preferable to place the grating G inside or outside the focus of all zones to prevent difficulty in assigning ordinal numbers to the fringes in the reduction of the data. The deviation at the grating position is usually converted to that at the paraxial focus by using a factor easily determined from the geometry of the figure.

Figure 5:
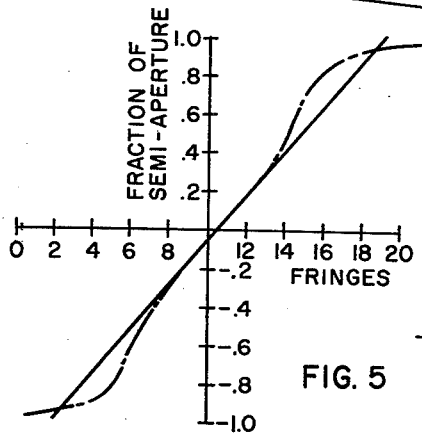
FIG. 5 is the fringe number against the fraction of the radius of the aperture for a photographic objective (not shown)
Figure 5A:
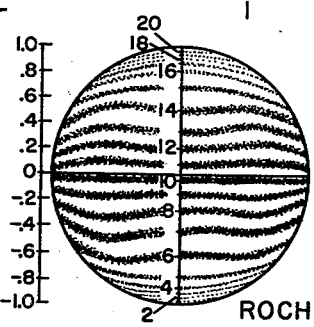
FIG. 5A is a schematic of the image obtained for the graphical representation of FIG. 5.

In off-axis testing it is generally preferable to determine the aberrational errors both for the meridional fan of rays and that fan of rays perpendicular to it by orientating the grating lines perpendicular to this plane and parallel to it, respectively. The components of the deviations can then be plotted for either the tangential and sagittal rays or around each zone as preferred. The plotting of the tangential and sagittal rays can be done rapidly by assigning ordinal numbers to the fringes across that diameter which is perpendicular to the central fringe, and then, as shown in FIG. 5, plotting the position as ordinate versus the fringe number as abscissa, preferably choosing the scales so that the resulting curve has a slope of approximately unity. Similar graphs can be drawn for a series of lines parallel to the diameter to which FIG. 5 relates, so that information is displayed for points all over the lens.

As shown in FIG. 5, a straight line can then be drawn through the points representing the central zone. The difference between the abscissas for the curve and for the straight line for each ordinate value may then be divided by the distance between the grating G and the rear nodal point of the lens L and multiplied by the grating constant (interval) and the focal length of the lens. This may then be plotted against the value of the radius for each point giving one component of the transverse aberration (the distance that a particular ray falls from the ideal image point in the image plane). It is felt that, in general, the curve as given in FIG. 5 would be just as valuable without further reduction if standard grating intervals were used.

As was explicitly recognized by Ronchi, the above simple theory fails to predict what actually happens when a grating is placed in the light path. To determine what actually happens, it is necessary to consider the wave nature of light. The following is based on Ronchi's paper "La Prova dei Sistemi Ottici," referred to above.

Figure 3:
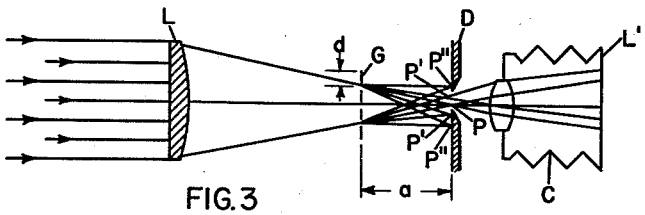
FIG. 3 is a diagram of a system similar to those illustrated in FIGS. 1 and 2, but has a suitably placed diaphragm to pass only certain order spectra.

FIG. 3 shows light imaged at a point, P, by a lens L. A grating, G, having an interval of "d" measured between corresponding portions of each line, is placed in the region indicated. If the light is monochromatic, then first order spectra are produced above and below the image at the points P', and spectra of higher orders at points not shown, further from P.

Figure 3A:
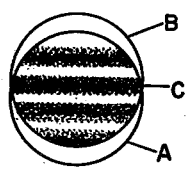
FIG. 3A is a diagram of the image obtained by the optical system illustrated in FIG. 3.

If only the zero order spectrum is allowed to pass (the others being stopped by a suitably placed diaphragm D), then a round disc of light A will be seen on the screen L', and no trace of the image of the grating G will be visible. If now, as indicated in FIG. 3, one of the first order spectra P' is allowed to pass also, a second circle of light B will be seen whose center will be displaced from that of the first as shown in FIG. 3A, and, if the two circles A and B overlap, then in the overlap region C, fringes will appear due to interference between the light from P and P'.

If the other first order spectrum is allowed to pass also, then a third disc of light (not shown) will appear in a position corresponding to B but in an opposite sense, with corresponding interference fringes. After an explanation of the appearance of the fringes along the lines given above, Ronchi then explains that if the interval of the grating is large, so that the displacement of the discs A, B, and C is small compared with their diameter, the image may be analyzed in the manner indicated in FIG. 1, that is, to say each fringe can be identified with a particular zone of the lens L, with the exception that in no case does Ronchi indicate the use of a second lens (where the objective of the camera is located) in the system to image the second principal plane of the lens, in the position L'.

In order to visualize the above described experiment in its perspective, it will be necessary to consider the orders of magnitude which may be involved in such a test. Let it be assumed that 20 fringes would be a suitable number to properly evaluate the aberrations of the lens to be tested. If it is considered that it is desired to know the ray aberration to one one-hundredth of one millimeter (a resonable value for a modern photographic objective) and that the center of a fringe can be located to one-tenth of its interval in the image, then a grating of 10 lines per millimeter frequency is used.

With an aperture ratio of f/4, the grating would be placed eight millimeters from the plane of focus. If the light used were of wavelength 0.0005 millimeter, then the separation of the zero and first order spectra would be approximately 0.04 millimeter. Thus a slit of the order of 0.1 millimeter in width would be required to pass the zero and first order spectra to the remaining optical system. Such a diaphragm would also limit the resolution of the image formed to approximately one fringe width as measured in the image. In many cases, such resolution would not be satisfying for other reasons but it would appear desirable to locate a point in the image more closely than this in any case. Thus, it can be seen that this experiment as described by Ronchi is more or less meaningless and that the use of a diaphragm is a poor artifice at best for the removal of the effects of high order spectra.

Further opening of the diaphragm D in FIG. 3 merely introduces confusion. The light from the diffraction spectra of second and higher orders introduces additional inference effects; additional fringes appear and weaken the existing fringes so that the image cannot be interpreted.

At about the same time as Ronchi's publication, other experimenters were also exploring the uses of gratings (but not first order gratings according to the present invention) in the testing of optical systems as described by U.S. Patent No. 1,590,532, issued to Leon Lenouvel, for "Method and Arrangement for the Examination and the Regulation of Optical Systems," dated June 29, 1926, and issued in France July 4, 1922, which is an autocollimation method using a ruled screen. A French patent No. 587,034, filed October 7, 1924, discussed a method for evaluating and adjusting microscope objectives with the aid of a grid. This patent refers to another French patent No. 553,611 which also uses a grating. In recent years, much more experimentation has been done as evidenced by the publications on the subject and it is reasonable to suppose that a great deal was done of which no publication was made due to the basic difficulties of analysis of these diffraction patterns.

A clear idea of the state of the art at this period is probably most easily gained by reading the paper by Anderson and Porter of the Mount Wilson Observatory in the Astrophysical Journal, dated 1929. This paper describes the effects of diffraction on the image in giving either very faint lines or in giving lines which break up into a number of narrower bands. The blurring of the edges of the images is also described.

The most recently published paper which has appeared on this subject was that, already mentioned, given by G. Toraldo di Francia of the Istituto Nazionale di Ottica, Arcetri, Florence, Italy, at the National Bureau of Standards Semicentennial Symposium on Image Evaluation which was held at the National Bureau of Standards, Washington, District of Columbia, on October 18, 19, and 20, 1951. This paper was subsequently published in the proceedings of that symposium as part of NBS Circular 526, April 29, 1954. A study of these papers referred to above, will reveal the enormous amount of work which has been done in attempting to solve the problem of making quantitative tests of the aberrations of image forming systems by the use of gratings without any success in conquering the diffraction effects which made the experimental mehod so unsatisfactory.

At this point, it is believed desirable to define what is meant by a grating and by a grid. A grating is a sheet having transmittance, reflectance, or optical pathlength varying periodically in one direction across the sheet, while a grid is a sheet having variations of this kind in two perpendicular directions across the sheet. In usage, "grating" is a more general term than "grid," but strictly speaking, a grating is a grid whose variations in one direction are zero. For simplicity in this specification, the terms "transmittance" or "reflectance" will be used to describe the ratio of the amplitude of the transmitted or reflected light waves, respectively, to the amplitude of the incident light waves rather than the ratio of the intensity of the transmitted or reflected light waves, respectively, to the intensity of the incident light waves.

An ordinary amplitude grating acting by transmission might consist of a clear plate of glass with opaque parallel straight lines spaced at uniform intervals upon it, while an ordinary phase grating acting by transmission might consist of a clear plate of glass with grooves etched into it in the form of straight parallel uniformly spaced lines.

In addition, an ordinary amplitude grid acting by transmission might consist of a clear plate of glass with two sets of parallel, straight, equally spaced opaque lines at right angles to each other, while an ordinary phase grid acting by transmission might consist of a clear plate of glass with two sets of parallel, straight, equally spaced grooves etched into it at right angles to each other.

Reflectance gratings and grids are analogous to the above in that they produce a similar result on an incident wave front acting in reflectance rather than in transmission. In this specification, the use of the term grating will include grids as above defined. Thus, one might speak of a one-dimensional grating or a two-dimensional grating (the former being a true grating and the latter being a true grating) but one would not speak of a one-dimensional grid.

Several years ago, it was conceived by the applicant that if gratings were produced which gave only zero and first order spectra, then an appreciable improvement would be realized in results of Ronchi's grating test. It was further conceived that this could be achieved by taking the sharp clean gratings available and printing them diffusely on photographic plates, producing a grating which would transmit a coherent wave front through it but absorbing in such a manner that the amplitude of the transmitted wave front could be described as sinusoidally across the wave front, at least to an approximation.

The variation of transmittance across any grating can be expressed as a Fourier series, and in fact, as can be shown by vector analysis, the lowest sine term of this series is responsible for diffraction spectra of the first order, the next sine term for spectra of the second order, and so on. That is to say there will be no spectra except zero and first order if there is no sine term beyond the first in the series. Slight imperfections in the grating, represented by the presence of further sine terms with small coefficients, will lead to traces of higher order spectra, and these must be sufficiently small not to confuse the image produced by the grating. Transmittance is normally expressed as a proportion of incident intensity, and not as a proportion of incident amplitude. The Fourier series mentioned relates to amplitude. The transmittance expressed as a proportion of incident intensity varies as the square of the Fourier series.

A second type of grating that was conceived would uniformly transmit the amplitude but caused sinusoidal variations in phase across the wavefront. In this case also a variation expressed by a Fourier series with only a constant and one sine term produces only first order spectra, and the presence of higher terms involves higher order spectra, although the theory in this case is not identical since the mathematical expression of a phase change is different from the mathematical expression of an amplitude change.

Experiments were then begun by the applicant with the object of producing amplitude gratings which would give only spectra of the zero and first orders.

Gratings which, acting by absorption, produce spectra of zero and first order only, may be called simple amplitude gratings. These gratings have been produced by four basic methods, all of which involve the controlled reproduction of an ordinary grating which produces spectra of many orders. These methods are: printing with light from a broad or moving light source directed through the master grating onto a photographic plate separated slightly from the grating to soften the line edges; projection printing with defocusing to cause the reproduction to be unsharp; projection printing with perfect focus and stopping down so that the resolution of the projection is only sufficient to pass the basic line frequency of the master grating, so that the image produced has substantially sinusoidal variations at the basic line frequency; and the production of Fraunhofer spectra and then allowing only selected orders to produce interference fringes.

Each of these methods requires careful control of the exposure and development as well as considerable experimentation before good simple amplitude gratings are reproduced. This is due to the non-linear characteristics of photographic reproduction methods. In order to get a sinusoidal variation in the final image it is evidently necessary, due to the non-linearity of the photographic process, to put an image on the photographic material which is distorted from the final form while in the undeveloped stage, but which has such form that it will develop into a sinusoidal form when it goes through the non-linearity of the development process. In fact the best conditions are found by comparing gratings produced under different conditions. The grating can be held between an observer's eye and a narrow source, and the relative strengths of different orders of spectra noted. The object is to produce strong first order spectra and substantially no spectra of higher orders. It may be of some use in quantity production to use a negative-positive process, but as the negative would be a positive except for a half period shift, this is a matter only of convenience. The last method mentioned above requires further explanation.

Figure 7:
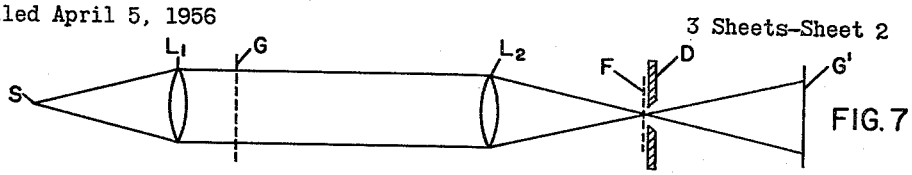
FIG. 7 is a diagram of an experimental optical arrangement for obtaining Fraunhofer spectra.
Figure 13:
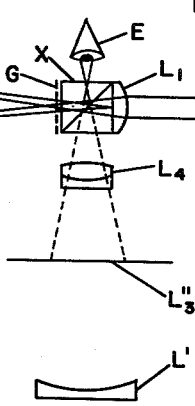
FIG. 13 is a diagram of an array of spectral orders as they appear in the plane normal to the optical axis for the arrangement of FIG. 7.

In the arrangement shown in FIG. 7, light from a line or point source is collimated by a lens $L_1$. The light then passes through a grating G of parallel lines or a grid of rectilinear lines. The diffracted wavefronts fall upon a lens $L_2$ and produce Fraunhofer spectra in the focal plane F of lens $L_2$. The array of spectral orders as they appear in the plane normal to the optical axis at F is shown schematically in FIG. 13 (which relates to a point source and a grid).

A diaphragm D is placed in the focal plane F so that only spectra of the desired orders are allowed to pass. The orders allowed to pass produce interference fringes in the plane G'.

Let it be assumed that the grid G and the screen G' are at conjugate planes with unity magnification. If the diaphragm D allows only the zero and first order spectra, due to a single set of parallel lines, say those given the identification (0), (1, 0) and (1, 0) in FIG. 13, to pass, then the image in the plane G' will have a distribution of light whose intensity varies with the distance of the optical axis in proportion to the square of the sign of a quantity proportional to that distance (if it is assumed that an opaque space in the grid is centered on the optical axis), that is, to say it varies in proportion to a constant and a sign term.

Under these conditions, the average line frequency in the image will be identical to that in the master grid. If the grid is moved in the direction of the optical axis, the frequency of the lines in the image will remain the same. However, the contrast will change, varying cyclically as the grid is translated. When the grid G is very close to the lens $L_2$ then the frequency of the lines at all points in the image will correspond to the average frequency of the lines in the master so if the master is not perfectly ruled the grating made from it may still have uniformly spaced lines over the entire image. This assumes that the lens $L_2$ is of such quality that it produces no distortion between the image plane G' and its conjugate plane.

If it is now wanted to produce a simple grid pattern in the conjugate plane of greater or lesser frequency than the master grid, the image plane G' must be moved correspondingly to the left or right, respectively. A suitable contrast can be achieved by small movements of the grid G in the region of the lens $L_2$.

Figure 8:
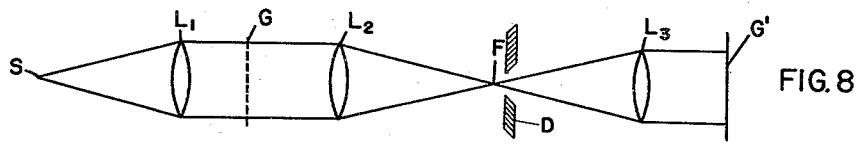
FIG. 8 is a diagram of an experimental optical arrangement similar to that illustrated in FIG. 7 except for addition of a third lens.

In cases where extreme uniformity of the simple grating over its entire surface is required, it may be desirable to add a third lens $L_3$ to the system in order to correct for aberrations occuring due to the lens $L_2$. The position of $L_3$ is shown in FIG. 8.

If simple grids be desired, the spectra (0), (1, 0), (1, 0), (0, 1) and (0, 1) are uncovered. In some cases, where a grid or grating of much higher frequency is desired, the corresponding higher order pair is uncovered with or without the zero order. In general, the zero order will halve the frequency given by the higher orders alone, but, in many cases, it will be difficult to get sufficient contrast in the pattern due to the relatively low intensity of the higher orders. In some cases, it may be necessary or desirable to use plates in the Fraunhofer diffraction plane which either advance (or retard) the phases of certain orders or else attenuate them or both. Many variations will be obvious in these experiments.

Figure 14:
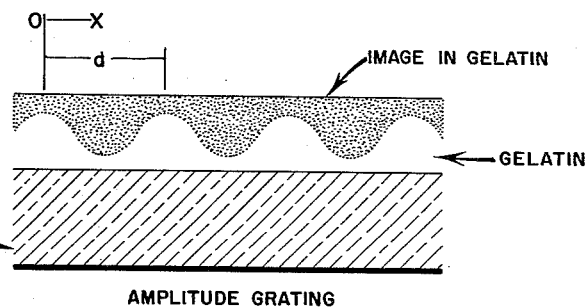
FIG. 14 is a cross-section of an amplitude grating constructed in accordance with the invention.

To produce a simple amplitude grating, a photographic film or preferably a plate is placed in the plane G' and exposed. It is then developed, fixed, washed, and dried, in the ordinary manner used in the photographic art. The finest available plates which are made specifically for the production of reticules should be used. FIG. 14 is a cross-sectional view of such a grating. Preferably, the range of variation in transmittance is substantially zero to one hundred percent.

If simple phase gratings are desired, it is necessary to convert the image on the plate to a "phase" image. By this, an image is meant which reproduces the variations of light intensity as variations of optical path length rather than a variation of absorptance or reflectance as is the usual case in the photographic art. In order to accomplish this, a modification of a process used for reversal printing in process work is employed. In this process, as modified, the plate after development is placed in a stop bath of 125 cc. per liter of 28 percent acetic acid in water for about one minute. Then the plate is placed in the following bath:

Solution A

| | |
|---|---|
| Water (50–65° C.) | cc__ 750 |
| Copper sulfate | g__ 120 |
| Citric acid | g__ 150 |
| Potassium bromide | g__ 7.5 |

Water, to make 1.0 liter.

Solution B

| | |
|---|---|
| Hydrogen peroxide | 3% |

Figure 15:
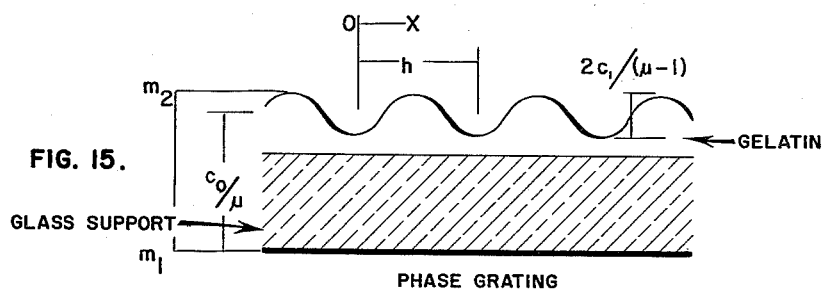
FIG. 15 is a cross-section of a phase grating constructed in accordance with the invention.

These two solutions are mixed fresh in equal parts by weight for each use. The plate is left in the solution until the image is completely bleached. The solutions A and B together produce a softening of the image as it is bleached so that the image and the gelatin containing it can be washed away leaving a positive relief image in the remaining gelatin. That is to say, the solutions together etch the gelatin. The image is then washed in running water at 18 to 23° C. until no more gelatin will wash off. It should then be fixed in a hardening type fixing bath to remove all silver and then thoroughly washed. Finally, it should be washed several times in distilled water and then dried slowly in a room of high relative humidity to prevent distortion. FIG. 15 is a cross-section view of such a grating.

In transmission type simple phase gratings, the depth of the etched gelatin is controlled by exposure and time of development so that the first order spectra are not stronger than that of the zero order for the wavelength for which the grating is designed. Optimum results are obtained when the variation in optical pathlength has a range of plus and minus one-either of a wavelength. For reflection phase gratings, the variations are appreciably less in depth and a reflecting coating is put on by a suitable method such as aluminizing by vacuum vapor coating techniques in the same manner as is commonly done on mechanically produced gratings and their mechanical replicas.

For certain purposes, a combination of amplitude and phase characteristics would be desirable in a grating. These can be produced by a very simple modification of the technique described above for the making of phase gratings.

Figure 16:
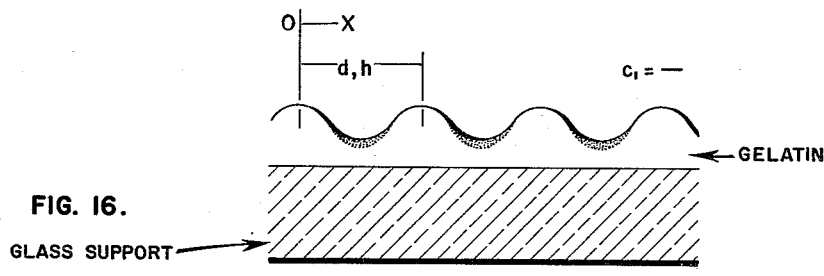
FIG. 16 is a cross-section of a phase retard amplitude grating constructed in accordance with the invention.

After partial development of the image, it is bleached and washed out as previously described. At this time, it is further developed, thus producing an amplitude image, the most transparent part of which is coincident with that of greatest phase retardation of the emergent wave. After the desired density is reached, the plate is fixed, washed, and dried. FIG. 16 is a cross-sectional view of such a grating.

Figure 17:
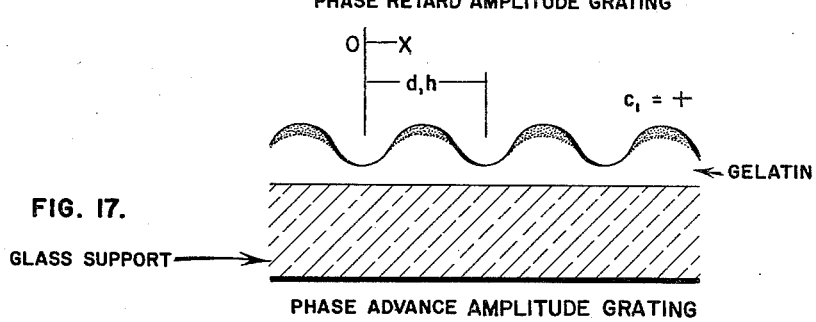
FIG. 17 is a cross-section of a phase advance amplitude grating constructed in accordance with the invention.

A variation of this is to carefully expose the plate uniformly a suitably determined amount to light after developing and stopping in the acetic acid bath. After bleaching and washing out, an amplitude image is developed which is precisely out of phase with the original image. This produces an amplitude image, the most transparent part of which is coincident with that of greatest phase advance of the emergent wave. FIG. 17 is a cross-sectional view of such a grating. These mixed gratings may be called respectively phase retard and phase advance simple amplitude gratings.

If it is desired to cover these gratings or grids with cover glasses, it is possible to cement cover glasses directly to the amplitude grating type with suitable cements. It is necessary, however, that phase gratings be separated from the cover glass by an air space if their characteristics are to be preserved.

In general terms, these particular gratings and grids according to the present invention have one or more of the optical properties of transmittance, reflectance, transmitted pathlength, and reflected pathlength varying cyclicly with distance across the grating or grid through several cycles substantially in proportion to a constant plus a sine of a quantity proportional to the distance, in such a manner as to produce diffraction spectra of zero and first orders, but no substantial spectra of other orders.

In practice it is difficult to determine by direct observation that a grating or grid has such variations. It is easier to detect the presence of such variations by their result, namely that the grating or grid, when interposed in a light beam from a narrow source which is brought to a focus, produces diffraction spectra of zero and first orders, but no substantial spectra of other orders.

In general terms gratings or grids according to the present invention may be made by producing an optical image in which the intensity varies continuously and cyclicly across the image, exposing a photographic material to the image, and then developing and if necessary etching the material so as to produce variable opacity across the material, or variable thickness across the material, or both variable opacity and variable thickness.

Figure 2A:
FIG. 2A is a diagram of the image obtained by the optical system of FIG. 2.

Amplitude gratings produced by these methods were tested in a system as shown in FIG. 2, with excellent results being obtained. The objectionable effects common to the use of ordinary gratings, and due to diffraction spectra of second and higher orders, were found to be completely absent in these tests. It was further found that only a single image was produced, as shown in FIG. 2A. The formation of a single image by the use of gratings of this type without the use of any diaphragm is in distinct contrast with the statements of Ronchi referred to earlier in this application.

Several photographs were made with various refracting objects in the field which distorted the fringes. These included ordinary glass, plate glass, and a burning candle.

In order to clearly demonstrate that each part of the image corresponds to the equivalent part of the lens or other element in the conjugate plane with respect to the camera lens, a conception which is at the basis of the interpretation of these fringes as an experimental method of ray tracing, the fringe distribution for the paraboloid reflection was determined theoretically and compared with experiment. The agreement was excellent.

It was also shown theoretically that the area between a properly selected straight line and the experimental curve (of the type shown for a lens in FIG. 5) was a measure of the wave aberration i.e. of the departure of the wave from true spherical form. This area, as determined with a planimeter checked with the theoretical value within an amount of area equivalent to a few hundredths of a wavelength which was within the probable accuracy of the planimeter determination. The results indicated the localized nature of the fringes, i.e., refractive variations in the object field caused fringe distortion only in the corresponding portion of the image.

Figure 4:
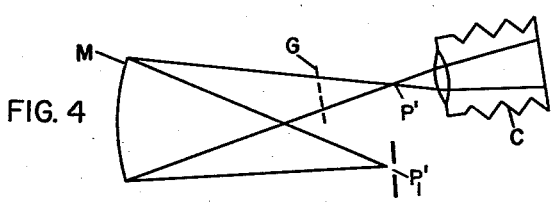
FIG. 4 is a diagram of one system according to the invention, in which a paraboloidal mirror is being tested.
Figure 4A:
FIG. 4A is a diagram of the image obtained by the optical system illustrated in FIG. 4.

In order to confirm and extend these results, tests were made at the approximate center of curvature of a 10″ diameter $f/4$ paraboloidal mirror M using the system shown in FIG. 4. Included in the same negative was the image of a 2-watt Western Union Concentrated Arc Lamp to show the spectra produced by the grating. Several gratings were used. Some showed zero and first order, and some showed zero, first, and second. It was clearly demonstrated that the multiple images were due to orders beyond the first. That is to say, a grating which produces three images of a light emitting object produces only a single image of an object in a coherent wavefront.

Subsequently, phase gratings were made by the process described earlier in this specification. These gratings were crystal clear and their only effect on the light transmitted by them was to change the phase in a sinusoidal manner across the grating. Some of these gratings produced only spectra of the zero and first order and these were used subsequently in the manner indicated in FIG. 4 on an $f/4$, 10″ diameter paraboloidal mirror. Light from a slit or point source P′ is reflected from the mirror M, passes through a grating or grid G close to an image $P_1$ of the source, and enters a camera C in which an image of the mirror is formed on the plate or film, acting as a screen. The results were similar to those described above for simple amplitude gratings, with minor variations. Both black and white and color photographs were made of the results. Indications were that while these phase gratings were very advantageous in their nearly perfect transmission of the full energy of the incident wave, their effect on the light varied with the wavelength.

Thus, the use of either first order amplitude gratings or of first order phase gratings allows the experimental tracing of rays in an optical system by giving in a single image one coordinate of a ray in the plane determined by the grating, as a function of the coordinates of that ray in another plane determined by the plane conjugate to that of the image. The use of simple grids allows simultaneous determination of both coordinates in that plane determined by the grid, but the results tend to be more difficult to interpret.

Furthermore, the use of these simple gratings will allow Ronshi's grating test to be made more conveniently than ordinary gratings will, in many, if not all, of the arrangements included in the literature of the optics art and patents pertaining thereto.

In the most general terms, in a method according to the present invention of testing an optical element, a beam from a narrow light source is directed through an optical system which includes the element and which serves to focus an image of the element on a screen and to focus an image of the source at an intermediate point between the element and the screen, a grating or grid producing substantially only zero and first order spectra is placed across the beam close to the intermediate point, and the fringes thereby produced on the screen are noted.

By optical element is means anything which can transmit or reflect a light beam. By narrow source is meant a slit or hole the width of which is so small that narrowing it would not cause any substantial change in the appearance of the image but only a change in brilliance.

In the most general terms, as already stated, a grating or grid according to the present invention consists of a thin sheet of material which has one or more of the optical properties of transmittance, reflectance, transmitted path length, and reflected pathlength varying across the sheet substantially in proportion to a constant plus a sine term of several cycles. In practice it is difficult to determine by direct observation that a sheet has such variations. It is easier to detect the presence of such variations by their result, namely that the thin sheet of material when interposed in a light beam from a narrow source which is brought to a focus, produces diffraction spectra of zero and first orders, but no substantial spectra of other orders.

Figure 6:
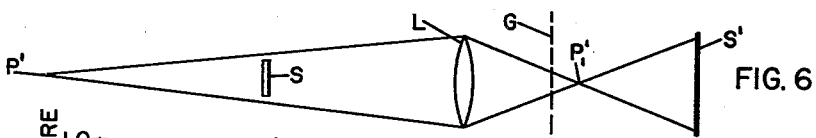
FIG. 6 is a diagram of another system according to the invention, for evaluation of a refractive disturbance in an otherwise homogeneous medium.

In FIG. 6, there is illustrated a system for the evaluation of optical disturbances. This apparatus comprises a point or slit source of light, P', which is located in an object position, a lens producing an image P' of the source, and a grating G which produces only spectra of the zero and first order and which is close to P', together with means, such as a camera, for recording an image of the refractive disturbance S on a screen at S'.

By means of this system, it is possible to obtain an image of the refractive disturbance S which is characterized by fringes whose disposition are a quantitative measure of the aberrations of the wavefront due to the refractive disturbance at S.

In any of these systems, a movement of the grating G, normal to the optical axis and to the lines of the grating G, will produce a corresponding displacement of the shadow fringes. Since the fringes provide, under suitable conditions, a greatly magnified image of the grating lines, it is possible to detect extremely small movements of the grating G or movements of the image P' relative to the rest of the system. This movement of the image P' may be a result of a movement of the source P' or of the lens L. In general terms, apparatus according to the present invention for detecting small displacements of a member comprises a narrow light source and an optical system which is traversed by a beam from the source and which includes an optical element, the system serving to focus an image of the element on a screen and serving to focus an image of the source at an intermediate point between the element and the screen, and the system including a grating or grid according to the present invention placed across the beam close to the intermediate point, the grating or grid or the source, or any convergent or divergent part of the system, being connected to the member so as to be moved across the beam as a result of small displacements of the member.

It should be understood that in FIG. 2 and FIG. 6 it is possible to substitute a source comprising a plurality of slits for the individual slit, provided that, in each case, the slit spacing is so adjusted that the shadow fringes produced by each of the slits will occupy the same position as the fringe produced by the remaining slits.

Figure 9:
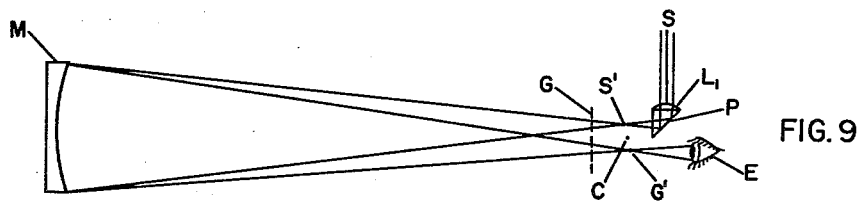
FIG. 9 illustrates a simple optical system for testing of concave mirrors.
Figure 10:
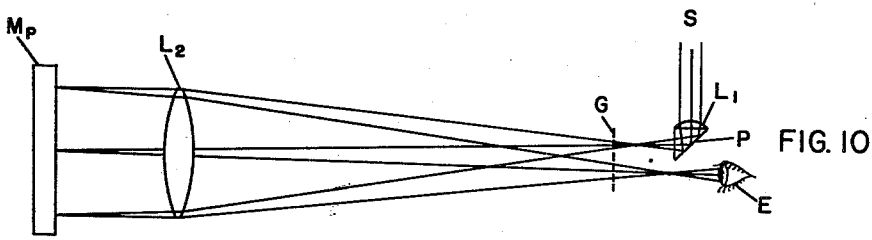
FIG. 10 illustrates a simple optical system for testing of flat mirrors or convergent lenses.
Figure 11:
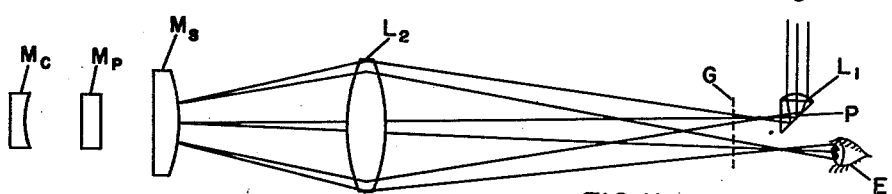
FIG. 11 illustrates three simple optical systems for testing of convergent lenses.
Figure 12:
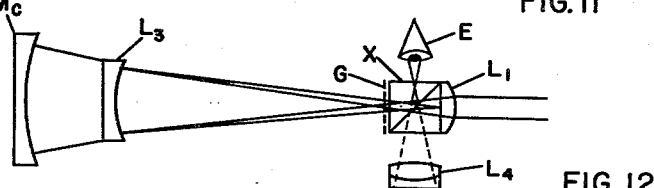
FIG. 12 illustrates a simple optical system for testing of divergent lenses.

Simple systems for the testing of concave mirrors or convergent lenses are shown in FIGS. 9, 10, 11. A similar system for the testing of divergent lenses is shown in FIG. 12. In these systems an eye is shown at the image position. The eye would only be used for rough experiments, and for practical testing would be replaced by a camera. All of these systems illustrate a practical application of the principle of using a plurality of sources properly arranged so that the fringes due to each of the sources coincide with the fringes due to all of the others in the image of the system.

This is accomplished by using a portion of the grating itself as the illuminating source. In all of these systems, the prism P is used either alone or in conjunction with a lens $L_1$ to direct light through a portion of a grating G.

The function of the lens $L_1$ is to allow a relatively small distant source to entirely fill the optical system through the prism P. Its absence necessitates the use of a source subtending as large an angle at the prism as does the optical system. The optical system must be such or must be made such by the addition of suitable elements that it can form an image of the grating near its own plane.

In FIG. 9, there is shown a system suitable for the testing of a concave mirror which has its center of curvature or, if it is not spherical, its average center of curvature, at C. Light from a distant source S is brought to a focus S' through the prism P by the lens $L_1$. It then passes through the grating G to the face of the mirror M. This mirror M then images the grating at S'', near the eye E which will then see, projected on the face of the mirror, fringes whose disposition will indicate the departure of the surface from that of a sphere. A perfect sphere, in this arrangement, would show the fringes as uniformly spaced straight lines. The distribution of the fringes in the case of aspheric surfaces may be calculated by means of analytical geometry. In practical testing, when the eye is replaced by a camera, the camera lens focuses an image of the mirror on the film or plate in the camera, which serves as the screen.

In FIG. 10, there is illustrated a system for testing the degree of correction of a lens $L_2$ for an object at infinity. The arrangement of the light source, prism and grid are the same as in FIG. 9. The light, after collimation by the lens $L_2$ being tested, is reflected back along nearly identical light paths to the portion of the grid G behind which the eye E is placed. The eye or camera focuses an image of the lens $L_2$. It is necessary, of course, that the mirror $M_p$ be optically flat if the test is to be valid. It is possible in this test to rotate the lens $L_2$ and determine the off-axis aberrations.

In FIG. 11, there is shown a system for determining the aberrations of a lens $L_2$ for objects at finite distances. In this case, a convex spherical mirror $M_s$ is placed with its center at the object distance from the lens $L_2$ being tested, thus returning the converging rays nearly back along their original paths. The eye or camera focuses an image of the lens $L_2$. In this arrangement it is also possible to rotate the lens $L_2$ to determine the off-axis aberrations. It is also possible to modify this arrangement by replacing the mirror $M_s$ by a plane mirror $M_p$ at the object point but this has the disadvantage that certain types of aberration cancel out due to the rays returning through corresponding points in the opposite side of the lens $L_2$. The convex mirror $M_s$ can be replaced by a concave mirror $M_c$ which has its center of curvature at the object point. This arrangement has the advantage of making the object point separately accessible without removing the mirror. This can be of great value in aligning such a system.

The system shown in FIG. 12 is suitable for the testing of a divergent lens $L_3$. A large concave mirror $M_c$ is used to return the rays approximately along their paths. In addition, FIG. 12 also shows variations in the grating arrangement and the prism. In this arrangement, a beamsplitter X, preferably of the prism type, is used. The eye E on looking down through the splitter X, as shown, sees an image $L_3'$ of the lens $L_3$ and an image of a sheet of paper which is placed at the position $L_3''$. The lens $L_4$ causes the image of the paper to be at the same distance from the beam-splitter X as the image $L_3'$ of the lens $L_3$. If the lens $L_4$ is essentially distortionless, then the positions of the fringes may be plotted directly onto graph paper at $L_3''$ thus giving essentially numerical data directly. Of course, the lens $L_4$ may be entirely dispensed with or may be placed between the eye E and the prism or even between the prism and the grid G in order to make the position of the images more convenient. It must be remembered, however, that its aberations, particularily distortion, may affect the accuracy of the results.

In order to facilitate a more precise description of these gratings, it is desirable to relate the action of the gratings on a wavefront of light (when used in the intended manner according to the teachings of this specification) to their physical form.

FIG. 14 shows an idealized cross sectional view of an amplitude grating as produced in a photosensitvie emulsion on a glass plate. It will be noted that the image is thinnest (and therefore most transparent) at points which may be indicated by $x=0, d, 2d \ldots nd,$ with intervals of greater thickness (and less transmissivity) in between these points.

Assume three coherent monochromatic wavefronts, two inclined slightly with respect to the third so that when $x$ increase by a value $d$, one wavefront is advanced in phase by $2\pi$ radians (one wavelength) and the second is retarded in phase by a like amount with respect to the third. The wavefronts may be represented:

$$f_1(x) = \frac{A_1}{2} \sin\left(\omega t + \frac{2\pi x}{d}\right)$$

$$f_2(x) = \frac{A_1}{2} \sin\left(\omega t - \frac{2\pi x}{d}\right)$$

$$f_3(x) = A_0 \sin \omega t$$

The sum of the three wavefronts may be written immediately $$F(x) = (f_1 + f_2) + f_3 = A_1 \sin \omega t \cos \frac{2\pi x}{d} + A_0 \sin \omega t$$

which represents a plane wavefront whose phase is not a function of $x$ (for $A_0 \geq A_1$) and whose amplitude varies across it (in any instant of time) in a simple periodic manner. As the phase is of no further interest, the expression can be evaluated for a value of $\sin \omega t = 1$, thus $$F(x) = A_0 + A_1 \cos \frac{2\pi x}{d}$$

and introducing the finite Fourier series which is desirable for compactness in more complex equations:

$$F(x) = \sum_{n=0}^{n=1} A_n \cos \frac{2\pi n x}{d}$$

which is the sum of all the terms evaluated for all integral values of $n$ from 0 to 1.

If a uniform wavefront of unit intensity (and amplitude) falls normally on a plane optical element with transmission $T(x)$, then the transmitted wavefront will have an intensity of $T(x)$ and an amplitude of $\sqrt{T(x)}$, so a grating with the transmission function:

$$T(x) = \left[\sum_{n=0}^{n=1} A_n \cos \frac{2\pi n x}{d}\right]^2$$

will produce the three wavefronts originally assumed. It should be noted that $A_1$ must not exceed $A_0$ in absolute value as this would make the value of the sum negative before it is squared, thus indicating a phase reversal. If the value of $A_1$ is very small compared to $A_0$, then the intensity of wavefronts one and two relative to the wavefront three will be reduced as the square of the ratio of $A_1$ to $A_0$. If the value of the ratio approaches zero, then the periodic term vanishes and the element is no longer a grating but a uniformly transmitting optical element of transmissivity $A_0^2$.

Now, consider three coherent monochromatic wavefronts, two slightly inclined with respect to the third so that when $x$ increases by a value $h$ one wavefront is advanced in phase by $2\pi$ radians and the second is retarded in phase by a like amount with respect to the third. Both have in addition, a phase advance of $\pi/2$ radians so that when the first two wavefronts are in phase they are $\pi/2$ radians advanced in phase with respect to the third. Thus, for all values of $x$ the resultant of the first two wavefronts is $\pi/2$ radians in phase difference from the third wavefront.

$$f_1(x) = \frac{C_1}{2} \sin\left(\omega t + \frac{2\pi x}{d} + \pi/2\right)$$

$$f_2(x) = \frac{C_1}{2} \sin\left(\omega t - \frac{2\pi x}{d} + \pi/2\right)$$

$$f_3(x) = C_0 \sin(\omega t)$$

Assume $C_1 = C_2 \leq \frac{1}{2} C_0$ $$F(x) = C_0 \sin \omega t + C_1 \cos \omega t \cos \frac{2\pi x}{d}$$

which is a wavefront of constant amplitude and varying phase as measured in the plane of the reference wavefront.

This sum may be written:

$$F(x) = \sum_{n=0}^{n=1} C_n \cos \frac{2\pi n x}{d}$$

Referring now to FIG. 15, the optical path difference from plane $m_1$ to plane $m_2$ (which defines the microscopic surface of the grating) is as follows:

$$L_T(x) = \mu \frac{(C_0)}{\mu} + \mu \frac{(C_1)}{\mu - 1} \cos \frac{2\pi x}{d} + \frac{C_1}{(\mu - 1)} - \frac{C_1}{\mu - 1} \cos \frac{2\pi x}{d}$$

$$= C_0 + \frac{C_1}{\mu - 1} + C_1 \cos \frac{2\pi x}{d}$$

but $c_1/\mu - 1$ is a constant which may be included in $C_0$ with no change in the effect of the results, so:

$$L_T(x) = C_0 + C_1 \cos \frac{2\pi x}{d} = \sum_{n=0}^{n=1} C_n \cos \frac{2\pi n x}{d}$$

which is identically that needed to produce the wavefront derived above, $F(x)$.

Combination of the above types of gratings are achieved by physical structure of the types illustrated in FIGS. 16 and 17. Both will produce three coherent wavefronts from a single incident wavefront. The phase differences for the resultant wavefronts can now have all values from $+\pi/2$ to $-\pi/2$ for the two inclined wavefronts with respect to the reference wavefront when they are in phase with each other, they are most simply expressed as a sum of two Fourier series of two terms each:

$$T(x) = \left[\sum_{n=0}^{n=1} A_n \cos \frac{2\pi x}{d}\right]^2$$

$$L_T(x) = \sum_{n=0}^{n=1} C_n \cos \frac{2\pi x}{d}$$

where $C_1$ is negative for the grating illustrated in FIG. 16 and positive for the grating illustrated in FIG. 17. It should be clear that if a reflecting film be formed on the periodic surface of the grating illustrated in FIG. 15 that a wavefront reflected from it (in the air space) will have impressed upon it a periodic phase variation such that:

$$L_R(x) = \sum_{n=0}^{n=1} D_n \cos \frac{2\pi n x}{d}$$

where $$D_n = \frac{2C_1}{(\mu - 1)}$$

The extension of the above theory to emcompass grids is straightforward but mathematically complex and it is here that the reason for the $\Sigma$ notation is appreciated. It can be shown that:

$$T(x, y) = \left[\sum_{n=0}^{n=1} \sum_{m=0}^{m=1} A_{nm} \cos \frac{2\pi nx}{d} \cos \frac{2\pi my}{e}\right]^2$$

$$L_T(x, y) = \sum_{n=0}^{n=1} \sum_{m=0}^{m=1} C_{nm} \cos \frac{2\pi nx}{d} \cos \frac{2\pi my}{e},$$

and $$L_R(x, y) = \sum_{n=0}^{n=1} \sum_{m=0}^{m=1} D_{nm} \cos \frac{2\pi nx}{d} \cos \frac{2\pi my}{e}$$

is a precise description (with the constants properly evaluated and the coordinate system properly chosen) of many types of grids (and gratings) all of which produce only spectra of the zeroth and first orders. If any portion of the above series does not apply, its constants will turn out to be zero. In general, the zeroth term of one series will represent all of the energy in the zeroth order and the rest will go to zero. The constants in the first order terms will have to sum vectorially to give both the amplitude and phase of the corresponding wavefronts. In any case the term containing $x$ will produce only two first order spectra as will the term containing $y$.

Obviously many modifications and variations of the present invention are possible in the light of the above disclosure. It is therefore to be understood that within the scope of the appended claims the invention may be practiced otherwise than as specifically described.

What is claimed is:

1. An optical grating, comprising, an optical grating material for producing only zero and first order spectra, said grating material having a periodic variation of the optical properties thereof, said grating material consisting of spaced areas of variable opacity varying in a continuous manner from a minimum to a maximum to a minimum, the opacity at the minimum being substantially zero and at the maximum being substantially opaque and repeating in a regularly recurring order, and in such a manner that the optical transmittance and pathlength characteristics vary sinusoidally for light transmitted by said grating material in two direction, both lying within said grating material.

2. An optical grating, comprising, an optical grating material for producing only zero and first order spectra, said grating material having a periodic variation of the optical properties thereof, said grating material consisting of spaced areas of variable opacity varying in a continuous manner from a minimum to a maximum to a minimum, the opacity at the minimum being substantially zero and at the maximum being substantially opaque and repeating in a regularly recurring order, and in such a manner that the optical transmittance and pathlength characteristics vary sinusoidally for light transmitted by said grating material in one direction lying within said grating material.

3. An optical grating, comprising, an optical grating material for producing only zero and first order spectra, said grating material having a periodic variation of the optical properties thereof, said grating material consisting of spaced areas of variable opacity varying in a continuous manner from a minimum to a maximum to a minimum, the opacity at the minimum being substantially zero and at the maximum being substantially opaque and repeating in a regularly recurring order, and in such a manner that the optical transmittance varies sinusoidally for light transmitted by said grating material in two directions, both lying within said grating material.

4. An optical grating, comprising, an optical grating material for producing only zero and first order spectra, said grating material having a periodic variation of the optical properties thereof, said grating material consisting of spaced areas of variable opacity varying in a continuous manner from a minimum to a maximum to a minimum, the opacity at the minimum being substantially zero and at the maximum being substantially opaque and repeating in a regularly recurring order, and in such a manner that the optical pathlength varies sinusoidally for light transmitted by said grating material in two directions, both lying within said grating material.

5. An optical grating, comprising, an optical grating material for producing only zero and first order spectra, said grating material having a periodic variation of the optical properties, said grating material consisting of spaced areas of variable opacity varying in a continuous manner from a minimum to a maximum to a minimum, the opacity at the minimum being substantially zero and at the maximum being substantially opaque and repeating in a regularly recurring order, and in such a manner that the optical transmittance varies sinusoidally for light transmitted by said grating material in one direction lying within said grating material.

6. An optical grating, comprising, an optical grating material for producing only zero and first order spectra, said grating material having a periodic variation of the optical properties thereof, said grating material consisting of spaced areas of variable opacity varying in a continuous manner from a minimum to a maximum to a minimum, the opacity at the minimum being substantially zero and at the maximum being substantially opaque and repeating in a regularly recurring order, and in such a manner that the optical pathlength in transmittance varies sinusoidally for light transmitted by said grating material in one direction lying within said grating material.

7. An optical element, comprising, a thin sheet of material for producing only zero and first order spectra, said sheet of material being arranged to vary periodically in optical transmittance and pathlength characteristics in two directions, both lying within said sheet of material in such a manner that said characteristics are defined by:

$$T(x, y) = \left[\sum_{n=0}^{n=1} \sum_{m=0}^{m=1} A_{nm} \cos \frac{2\pi nx}{d} \cos \frac{2\pi my}{e}\right]^2$$

$$L_T(x, y) = \left[\sum_{n=0}^{n=1} \sum_{m=0}^{m=1} C_{nm} \cos \frac{2\pi nx}{d} \cos \frac{2\pi my}{e}\right]$$

where the expressions $T(x, y)$ and $L_T(x, y)$ are the optical transmittance and pathlength in transmittance, respectively, for coordinate systems chosen independently for each expression which is a double Fourier series expansion containing terms of the zero and first order only, with the coefficients being subject to the following limitations imposed by the physical results desired: $A_{01}$ and $A_{10}$ being less than or equal to $A_{00}$; $C_{01}$ and $C_{10}$ being less than one-eighth of the wavelength of light with which the element is to be used; $d$ and $e$ being constants which determine the period of the characteristics which each helps to define, with $d=h$, $e=i$, and $C_{01}$ and $C_{10}$ being in absolute value and either positive or negative.

8. An optical element, comprising, a thin sheet of material for producing only zero and first order spectra, said sheet of material being arranged to vary periodically in optical transmittance and pathlength characteristics in one direction lying within said sheet of material in such a manner that said characteristics are defined by:

$$T(x) = \left[\sum_{n=0}^{n=1} A_n \cos \frac{2\pi nx}{d}\right]^2$$

$$L_T(x) = \left[\sum_{n=0}^{n=1} C_n \cos \frac{2\pi nx}{d}\right]$$

where the expression $T(x)$ and $L_T(x)$ are the optical transmittance and pathlength in transmittance, respectively, along the direction $x$, said expression being a Fourier series expansion containing terms of the zero and first order only, with the coefficients being subject to the following limitations imposed by the physical results desired: $A_1$ being less than or equal to $A_0$; $C_1$ being less than or equal to one-eighth of the wavelength of the light with which the element is to be used in absolute value and either positive or negative; $d$ being a constant which determines the period of the characteristics which it helps to define, with $d=h$, and $C_1$ being either positive or negative.

9. An optical element, comprising, a thin sheet of material for producing only zero and first order spectra, said sheet of material being arranged to vary periodically in optical transmittance in two directions, both lying within said sheet of material in such a manner that said transmittance is defined by:

$$T(x, y) = \left[ \sum_{n=0}^{n=1} \sum_{m=0}^{m=1} A_{nm} \cos \frac{2\pi nx}{d} \cos \frac{2\pi my}{e} \right]^2$$

where the expression $T(x, y)$ is the optical transmittance for a coordinate system in said sheet of material, said expression being a double Fourier series expansion containing terms of only the zero and first order, with the coefficients being subject to the following limitations imposed by the physical results desired: $A_{01}$ and $A_{10}$ being less than or equal to $A_{00}$; and $d$ and $e$ being constants which determine the period of the transmittance in each direction.

10. An optical element, comprising, a thin sheet of material for producing only zero and first order spectra, said sheet of material being arranged to vary periodically in optical pathlength in two directions, both lying within said sheet of material in such a manner that said pathlength is defined by:

$$L_T(x, y) = \left[ \sum_{n=0}^{n=1} \sum_{m=0}^{m=1} C_{nm} \cos \frac{2\pi nx}{d} \cos \frac{2\pi my}{e} \right]^2$$

where $L_T(x, y)$ is the optical pathlength for a coordinate system in said sheet of material, said expression being a double Fourier series expansion terms of only the zero and first order, with the coefficients being subject to the following limitations desired: $C_{01}$ and $C_{10}$ being less than or equal to one-eighth of a wavelength of the light with which the element is to be used; and $d$ and $e$ being constants which determine the period of the optical pathlength variations in each direction.

11. An optical element, comprising, a thin sheet of material for producing only zero and first order spectra, said sheet of material being arranged to vary periodically in optical transmittance in one direction lying within said sheet of material in such a manner that said transmittance is defined by:

$$T(x) = \left[ \sum_{n=0}^{n=1} A_n \cos \frac{2\pi nx}{d} \right]^2$$

where the expression $T(x)$ is the optical transmittance as a function of the distance $x$ in said sheet of material, said expression being a Fourier series expansion containing terms of only the zero and first order, with the coefficients being subject to the following limitations imposed by the physical result desired: $A_1$ being less than or equal to $A_0$; and $d$ being a constant which determines the period of the transmittance.

12. An optical element, comprising, a thin sheet of material for producing only zero and first order spectra, said sheet of material being arranged to vary periodically in optical pathlength in transmittance in one direction lying within the sheet in such a manner that said pathlength is defined by:

$$L_T(x) = \left[ \sum_{n=0}^{n=1} C_n \cos \frac{2\pi nx}{d} \right]$$

where the expression $L_T(x)$ is the optical pathlength as a function of $x$ in said sheet of material, said expression being a Fourier series expansion containing terms of only the zero and first order, with the coefficient being subject to the following limitations imposed by the physical results desired: $C_1$ being less than or equal to one-eighth of the wavelength of the light with which the element is to be used; and $d$ being the constant that determines the period of the optical pathlength variation.

13. As a new article of manufacture, an optical grating consisting of an optical material for producing only zero and first order spectra, said optical material having a sinusoidal periodic variation of the optical properties thereof, said optical material having spaced areas of variable opacity varying in a continuous manner from a minimum to a maximum to a minimum, the opacity at the minimum being substantially zero, and at the maximum being substantially opaque and repeating in a regularly recurring order.

14. As a new article of manufacture, an optical grating consisting of an optical material for producing only zero and first order spectra, said optical material having a sinusoidal periodic variation of the optical properties thereof, said optical material having spaced areas of variable opacity varying in a continuous manner from a minimum to maximum to a minimum, the opacity at the minimum being substantially zero, and at the maximum being substantially opaque and repeating in a regularly recurring order, and in such a manner that the optical transmittance, and pathlength characteristics vary sinusoidally for light transmitted by said optical material in two mutually perpendicular directions.

15. As a new article of manufacture, an optical grating consisting of an optical material for producing only zero and first order spectra, said optical material having a sinusoidal periodic variation of the optical properties thereof, said optical material having spaced areas of variable opacity varying in a continuous manner from a minimum to a maximum to a minimum, the opacity at the minimum being substantially zero, and at the maximum being substantially opaque and repeating in a regularly recurring order, and in such a manner that the optical transmittance, and pathlength characteristics vary sinusoidally for light transmitted by said optical material in two mutually perpendicular directions, with any one of said optical transmittance, and pathlength characteristics or combinations thereof being arranged to vary from a minimum to a maximum.

16. As a new article of manufacture, an optical grating consisting of an optical material for producing only zero and first order spectra, said optical material having a sinusoidal periodic variation of the optical properties thereof, said optical material having spaced areas of variable opacity varying in a continuous manner from a minimum to a maximum to a minimum, the opacity at the minimum being substantially zero, and at the maximum being substantially opaque and repeating in a regularly recurring order, and in such a manner that the optical transmittance, and pathlength characteristics vary sinusoidally for light transmitted by said optical material in at least one direction lying within said grating material.

17. As a new article of manufacture, an optical grating consisting of an optical grid arrangement for producing only zero and first order spectra, said optical grid arrangement having a sinusoidal periodic variation of the optical properties thereof, said optical grid arrangement having spaced areas of variable opacity varying in a continuous manner from a minimum to a maximum to a minimum, the opacity at the minimum being substantially zero, and at the maximum being substantially opaque and repeating in a regularly recurring order, and in such a manner that the optical transmittance, and pathlength characteristics vary sinusoidally for light transmitted by said optical grid arrangement in two mutually perpendicular directions.

(References on following page)

References Cited in the file of this patent

UNITED STATES PATENTS

| | | |
|---|---|---|
| 818,966 | Ives | Apr. 24, 1906 |
| 1,565,533 | Twyman et al. | Dec. 15, 1925 |
| 1,590,532 | Lenouvel | June 29, 1926 |
| 1,744,642 | Kondo | Jan. 21, 1930 |
| 2,357,913 | Sigford | Sept. 12, 1944 |
| 2,451,164 | Grimson | Oct. 12, 1948 |
| 2,463,280 | Kaehni et al. | Mar. 1, 1949 |
| 2,541,437 | Prescott | Feb. 13, 1951 |
| 2,642,770 | Zobel | June 23, 1953 |

OTHER REFERENCES

"Physical Optics," by R. W. Wood, The Macmillan Company, 1936, Third edition, pages 236–264.

"Energy Distribution of Diffraction Gratings as a Function of Groove Form," Stamm et al., Journal of the Optical Society of America, vol. 36, No. 1; January 1946; pages 2–12.

"Gratings Made of Photographing Interference Fringes," Hopkins et al., Journal of the Optical Society of America, vol. 38, No. 7, July 1948; pages 661, 662.

"Fundamentals of Optics," by Jenkins and White, McGraw-Hill Book Co., 1950, Second edition, pages 335–340.